United States Patent [19]

Rohmann

[11] Patent Number: 4,990,350

[45] Date of Patent: Feb. 5, 1991

[54] PROCESS FOR PREPARING REDUCED ALCOHOLIC SPIRITS AND THE PRODUCT PRODUCED THEREFROM

[75] Inventor: Thomas Rohmann, Mahopac, N.Y.

[73] Assignee: Joseph E. Seagrams and Sons, Inc., New York, N.Y.

[21] Appl. No.: 465,384

[22] Filed: Jan. 16, 1990

[51] Int. Cl.$^5$ ............................................. C12G 3/08
[52] U.S. Cl. ................................ 426/330.4; 426/592; 210/652
[58] Field of Search ....................... 426/592, 330.4; 210/652, 644

[56] References Cited

U.S. PATENT DOCUMENTS

| 4,086,215 | 4/1985 | Kurihara | 210/654 |
| 4,499,117 | 2/1985 | Bonneau | 426/592 |
| 4,529,793 | 7/1985 | Abe | 210/500.28 |
| 4,532,140 | 7/1985 | Bonnome | 426/592 |
| 4,610,887 | 9/1986 | Galzy | 426/592 |
| 4,612,196 | 9/1986 | Goldstein | 426/592 |
| 4,617,127 | 10/1986 | Light | 426/592 |
| 4,792,402 | 12/1988 | Fricker | 210/652 |
| 4,888,189 | 12/1989 | Gnekow | 210/652 |
| 4,933,198 | 6/1990 | Lee et al. | 426/592 |

Primary Examiner—Carolyn Paden
Attorney, Agent, or Firm—Kane, Dalsimer, Sullivan, Kurucz, Levy, Eisele and Richard

[57] ABSTRACT

The invention comtemplates a process for the removal of a portion of the alcohol from a distilled spirit without destroying the organoleptic properties of the spirit. The process comprises passing a barrel strength feed stream through a permeable membrane at high pressures, splitting the feed into permeate and retentate components. The entire process occurs in one pass through the permeator system.

10 Claims, 2 Drawing Sheets

PROCESS FOR PREPARING REDUCED ALCOHOLIC SPIRITS AND THE PRODUCT PRODUCED THEREFROM

BACKGROUND OF THE INVENTION

Over the past decade or so, the drinking habits of Americans have undergone substantial change, as evidenced by the reduction in the consumption of alcoholic beverages over the past few years. From 1980 to 1987, beer consumption decreased 7 percent, wine consumption decreased 14 percent, and distilled spirits consumption decreased 23 percent. (New York Times, Mar. 15, 1989, page A1).

According to published sources, the reasons for the decline are numerous. There was a federal excise tax increase on distilled spirits in 1985, and there were numerous state excise tax increases in the 1980's, all of which increased the effective price to consumers.

There is an increased health consciousness on the part of Americans. They exercise more and moderate many activities in their lives, including alcohol consumption.

Also, there are numerous reports of what appears to be an increased social awareness as to the dangers of immoderate drinking. The efforts of concerned citizens, as well as heightened law enforcement activity aimed at curbing driving under the influence, has had a profound influence on our social mores. Today the seriousness of driving while impaired is more fully recognized.

Being socially responsible, as well as commercially affected by these trends, the producers of alcoholic beverages have adopted numerous strategies in conformance with these perceived new attitudes, including the introduction of products of reduced alcohol content. A wide variety of alcohol reduced products, namely beers and wines, are now available.

Low alcohol beers (a/k/a light beers) are especially popular. They have been marketed since the mid 1970's and have attracted a substantial share of the beer market. Virtually every major brewery now markets its own light beer. The reduced alcohol wines that have been marketed for some period of time have largely not been successful, most probably due to poor taste. New, allegedly improved reduced alcohol wines, however, have been recently introduced, so it is still too early to gauge the commercial success of this category.

Until now, there has only been attempt at producing a distilled spirit with a reduced alcohol content by dilution, which dramatically alters the flavor profile. The unavailability of reduced alcohol, but not diluted, distilled spirits leaves a substantial void in the market place. Many people would prefer a mixed drink over a wine or a beer, but there are no distilled spirits of lowered alcohol available having the flavor of their higher proof counterparts. Of course, they can request that their drink be mixed with less liquor and more mixer, but this is generally unacceptable to the consumer, since the distilled spirit is an important flavor constituent. Adding less spirits adversely alters the taste of the drink, as would be the case with a distilled spirit diluted with too much water. It is clear, therefore, that the best solution to this problem is to make available to the public distilled spirits which have a reduced alcohol content, while retaining all of the flavor and essences (i.e. the organoleptic properties) of their full strength derivatives.

Heretofore effective alcohol reduction methods have been proposed for beer and wine; but such methods have not been provided for the reduction of alcohol and of distilled spirits. Most traditional types of U.S. spirits products, as defined under Federal and State regulations, have an alcohol content of 40 percent by volume (80 proof) or greater.

When reducing the alcohol content of spirits, a method must be devised wherein the alcohol content can be reduced without destroying or otherwise adversely altering the flavor and organoleptic properties of the reduced alcohol spirit. Distillation or other processes employing heat are unacceptable for this task. Exposing a spirit to heat produces a reduced alcohol product which has significant negative differences from the flavor and other organoleptic properties of the original product. Accordingly, any process for reducing the alcohol content of distilled spirits, if it is to be organoleptically acceptable and commercially effective, cannot utilize heat.

One such method used to separate components of a mixture which does not rely upon heat is reverse osmosis. The prior art discloses processes whereby the alcohol content of alcoholic beverage is reduced by means of reverse osmosis. For example, U.S. Pat. No. 4,499,117 discloses a process whereby the natural alcohol containing liquid is subjected to ultrafiltering at low pressure, using a filter whose molecular weight separation threshold is 10,000, which forms a retentate and filtrate. The filtrate is then subjected to reverse osmosis under pressure using a filter whose molecular weight separation threshold is 250 to form a second retentate and filtrate, and then evaporating the filtrate by vacuum distillation at low temperature, forming a third retentate composed of molecules with molecular weight less than 250, and a distillate which is alcohol, and then mixing the aforementioned components to form the reduced alcohol beverage. This is not an efficient process, since it requires three successive steps of physical fractionation and, therefore, is a time consuming process. Furthermore, vacuum distillation may cause the removal of volatile components of the spirit which are responsible for the flavor and organoleptic properties that provide its essential character.

In U.S. Pat. No. 4,532,140, a process is disclosed wherein an alcohol containing liquid is subjected to either ultrafiltration or reverse osmosis, creating a concentrate and permeate. The permeate is then subjected to a second reverse osmosis procedure, whereby the permeate contains water as opposed to alcohol. The concentrates from the two passes are then combined. This process is limited solely to the alcohol reduction of wines and beers (must and worts). Also, this process required multiple fractionations in order to achieve the desired result. It therefore is not an efficient process.

In U.S. Pat. No. 4,612,196, a process is disclosed for reducing the alcohol content of a malt beverage by reverse osmosis, utilizing a thin film composite membrane having a polyamide active barrier on a microporous polysulfone support. This membrane, having chloride ion rejection capabilities of 98% for a 5000 mg/l solution of NaCl at 15° C. and 580 psi, retains the volatiles and other flavor constituents of the beer while allowing 25 to 30% of the alcohol to pass through the membrane as permeate. The process is entended to operate at pressures between 500 and 900 psi. The process described in this patent would not apply to distilled spirits.

In U.S. Pat. No. 4,717,482, a reverse osmosis technique is disclosed utilizing a semipermeable membrane with a chloride ion rejection rate greater than 80% at a net pressure of 400 psi. The membrane separates the alcohol containing feed into a retentate and permeate, the latter comprised of mainly alcohol and water. The retentate, also containing alcohol, is recycled back to the reverse osmosis system where it is admixed with the fresh feed and water. This process is limited to removal of alcohol from beer or wine. It utilizes a recycle process wherein 80 to 99 percent of the retentate is recycled back into the system. Since a relatively small fraction of the retentate is drawn off, constituting the reduced alcohol beverage, this process is extremely inefficient.

In U.S. Pat. No. 4,788,688, a process is disclosed wherein the ethanol content of a distilled spirit (and none of the water contained therein) is removed. The process relies solely upon diffusion across a semi-permeable membrane as the means by which alcohol content is reduced. The membranes chosen are generally permeable to water and ethanol. However, because ethanol extraction fluids are utilized which do not permit the passage of water through the membrane, only ethanol can pass therethrough. These ethanol extraction fluids can be either of two kinds: either a water immiscible fluid in which ethanol is soluble; or an aqueous solution of an osmotic agent exhibiting an osmotic pressure equivalent to or approximately that of the ethanol containing feed stream. This process does not adequately solve the problem of removing the alcohol content of a distilled spirit because it is an inefficient process and a difficult operation to maintain. Alcohol reduction depends solely upon the difference in ethanol concentration across the semi-permeable membrane, i.e.—the diffusional driving force. The rate of mass transfer may be controlled by varying the flow rate of the extraction fluid. However, the flow rates of the alcoholic beverage must remain low in order to insure adequate retention time inside the reactor vessel. Because the flow rates must be limited, it is questionable whether utilizing this process to reduce the alcohol content of a batch quantity of distilled spirits is a commercially viable operation. In any event, the process does not utilize pressure as a means for effecting the removal of alcohol. Indeed, pressure cannot be used because the use thereof would probably cause broken fibers or membrane defects that would contaminate the feed stock with the extraction fluid, ruining the feedstock and rendering it unconsumable and of no commercial value.

SUMMARY OF THE INVENTION

Therefore, the primary object of the present invention is to provide a process whereby the proof of distilled spirits is effectively reduced, without destroying or adversely affecting the flavor and organoleptic properties of the reduced alcohol product.

Another object of the invention is to provide a process for the reduction of the alcohol content of distilled spirits which does not utilize evaporation because, as noted above, evaporation due to heating adversely affects the organoleptic properties of the reduced alcohol product.

A further object of the invention is to reduce the alcohol content of distilled spirits in a process wherein the feed stream makes only one pass through the equipment utilized in reducing the alcohol content in order to increase the efficiency and economic viability of the process.

A still further object of the invention is to develop a process of the foregoing type capable of operating at substantially high pressure which permits the utilization of a single pass through the equipment while extracting the desired amount of alcohol without adversely affecting organoleptic properties of the product.

The aforenoted objectives and advantages are effectively obtained by the process of the invention which permits improved efficiency of the reverse osmosis removal process because it does not require a recycling of the feedstock, nor does it require multiple fractionation of the components of the feed. The entire removal process occurs in one pass of the feedstock through a reverse osmosis system. In order to achieve this goal the process is run at pressures in the range of 1000–1500 psi. The use of high pressure permits the separation process to occur in one pass.

In a successful application of this invention, the alcohol content of a distilled spirit is reduced by feeding the distilled spirits into a reverse osmosis permeator system containing at least one permeator membrane, and therein separating the distilled spirits feed stream into retentate and permeate components by applying pressure to the feed stream against the permeator membrane, and maintaining the applied pressure at between 1000–1500 psig.

DETAILED DESCRIPTION OF THE PREFERRED EMBODIMENT

Figure 1:
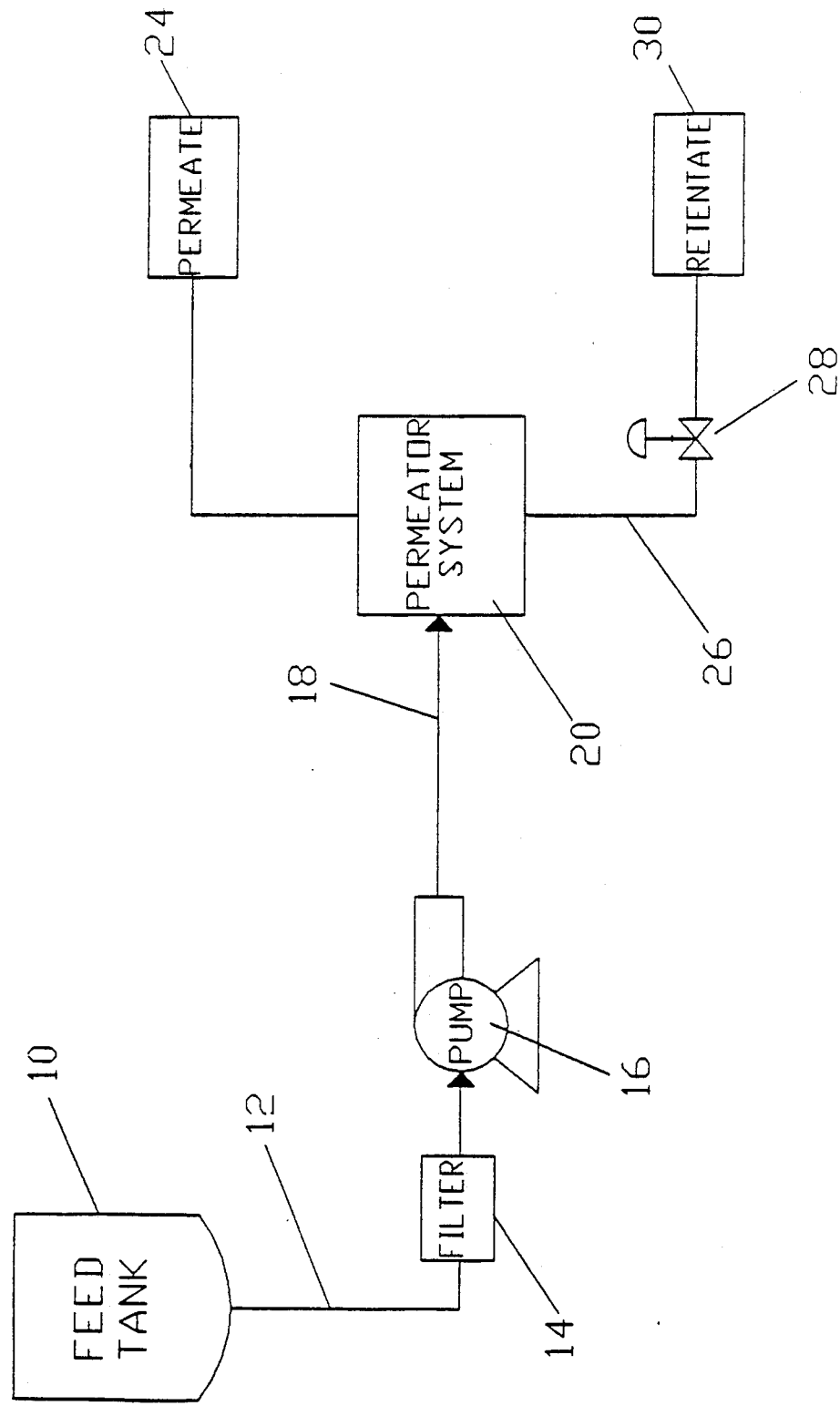
FIG. 1 is a flow diagram depicting the process described herein.

In the process disclosed herein, a batch of distilled spirits at barrel strength in the range of 120 to 190 proof is split into two components. The first component is reduced with water to approximately 100 proof and maintained in a feed tank 10. The second component is diluted with water to approximately 80 proof. The first component is the feed stream and passes through a pipe 12 and a filter 14. The filter 14 is composed of a cellulose material, which removes traces of barrel char which if unremoved would plug the permeator membranes to be described in detail shortly. Cellulose is utilized because of its compatibility with whiskey.

A pump 16 feeds the feed stream through a pipe 18 into the permeator system 20, where the separation process takes place. Each permeator is a shell containing a number of Dupont B-10 aramid hollow fiber membranes, which are selected because of separation characteristics, surface area density and pressure resilience. The permeators may be arranged in series or in parallel or in any other combination thereof. As a result of the high pressure required by this process, the hollow fiber membranes must be able to withstand these high pressures and not collapse when exposed to the pressurized environment Therefore, these hollow fiber membranes are sturdy and resilient; able to withstand the rigors of the environment. An additional advantage of these membranes is their immunity to the eroding effects of a high alcohol content fluid such as whiskey. This is essential in insuring the end products are consistent throughout the entire process. These polymer membranes are polyaramides identified as 2-4 diaminobenzenesulfonic acid, calcium salt (2:1), polymer with 1,3-benzenediamine, 1,3-benzenedicarbonyl dichloride, and 1,4-benzenedicarbonyl dichloride. These membranes have chloride ion rejection characteristics of greater than 90% at 800 psig at 25° C.

The applied pressure in the permeator system is maintained in the range of 1000-1500 psig. Temperature is maintained in the range of 40° F. to 90° F. It should be noted that because of the high alcohol levels, process swelling of the membranes is believed to occur, which causes a change in the membranes separation characteristics and a decrease in the flow of the permeate. However, this increases the effectiveness of the process of this invention since a higher proof permeate also results.

Inside the permeator system, the excessive pressure described above causes reverse osmosis, separating the feed stream into two components: a retentate and a permeate. Because of their smaller molecular sizes, most of the alcohol and water of the feed stream (but not the whiskey flavor components) passes through the permeator membranes, and comprise the stream known as the permeate. That which does not pass through the permeator membranes is the retentate, which contains whiskey flavor components which are responsible for the organoleptic flavor properties of the spirits that constitute the feed stream.

A pressure regulating valve on the retentate line 30 aids in regulating pressure in the permeator system. Furthermore, the number and arrangement of membranes affects the flow capabilities through the permeator system. Flow is also affected by the capacity of the pump 16.

By varying the feed rate and the applied pressure, in a successful application of this invention the feed stream was split into a 30% to 70% ratio between the retentate and permeate. This was achieved by regulating the feed rate and the applied pressure on the permeator or RO system. The permeate and retentate stream are drawn off from the permeator system by the permeate line 24 and retentate line 30. In this application the proof of the retentate stream was approximately 109, and the proof of the permeate stream was approximately 96.

The retentate stream is a concentrate of the feed stream, and, therefore, it contains all of the flavor and organoleptic properties thereof. A low alcohol blend may then be produced by adding water to the retentate in an amount equal to the volume of feed stream removed as permeate. Furthermore, since the retentate contains all the properties of the feed stream, it may be used in blends of the distilled spirit which comprise the feed stream.

It is to be noted that this entire separation procedure, because of the properties of the permeator or RO system, as well as the regulation of the flow rate and applied pressure, occurs in only one pass of the feed stream through the permeator system.

Table 1 sets forth the results of a chemical analysis of the 54° proof blend prepared by the RO process compared to the conventional 80° proof blend, as well as a 54° proof blend simply diluted with water. In comparing the analysis of the RO process with the conventional 80° proof blend, the blend components are substantially equivalent. However, in comparing the data complied from the 80° proof blend with the 54° proof blend prepared by dilution it is noted that the blend components are not equivalent. Furthermore, tests have shown that the 54° proof blend prepared by RO has the same mouth feel and organoleptic properties as the 80° proof blend minus the alcohol effect.

Figure 2:
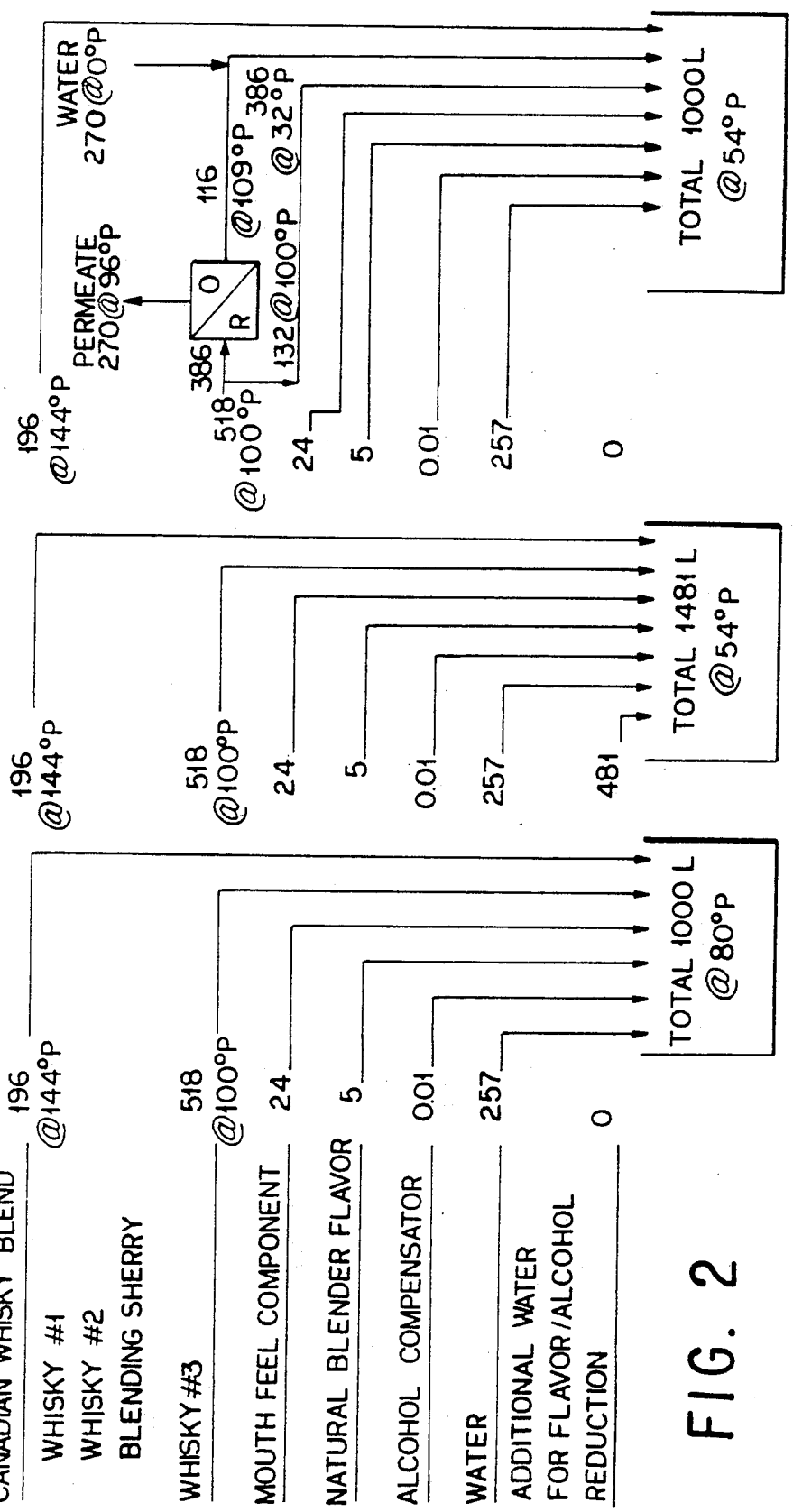
FIG. 2 is a chart of the components of the whiskey blends of Table 1.

FIG. 2 sets forth the components of the three aforementioned whiskey blends. What is notable is that in preparing either blend a practitioner of the invention uses the same alcoholic or whiskey or blending components in the same proportions for either the 54° proof RO process or the 80° proof conventional process.

TABLE 1

| | GAS CHROMATOGRAPHIC RESULTS | | |
|---|---|---|---|
| SAMPLE | Sample A Unprocessed RO 80° P. | Sample B Processed 54° P. | Water Addition Process 54° P. |
| | Congerners (mg/100 mL) at strength found | | Theorectical Sample By Dilutation With Water |
| Ethyl Alcohol STRENGTH (%) | 40 | 27 | 27 |
| Acetaldehyde | 1.08 | 1.08 | 0.72 |
| Methyl Formate | ND | ND | ND |
| Methanol | 2.48 | 1.59 | 1.65 |
| Acrolein | ND | ND | ND |
| Ethyl Acetate | 8.76 | 8.45 | 5.84 |
| N-Propanol | 2.88 | 2.84 | 1.92 |
| Isobutanol | 7.00 | 6.91 | 4.67 |
| N-Butanol | 0.04 | 0.05 | 0.03 |
| Ethyl Proprionate | 0.20 | 0.19 | 0.13 |
| Acetal | 0.72 | 0.32 | 0.48 |
| Isoamyl Alcohol | 15.44 | 15.09 | 10.29 |
| Active Amyl Alcohol | 6.16 | 5.99 | 4.11 |
| Furfural | UP | 0.32 | — |
| Isoamyl Acetate | 0.037 | 0.036 | 0.024 |
| Styrene | ND | ND | ND |
| HIGH BOILERS (mg/100 mL absolute) | | | |
| STRENGTH (%) measured by: | 40 | 27 | 27 |
| C6 Ethyl Ester | 0.026 | 0.026 | 0.016 |
| C7 Ethyl Ester | 0.005 | 0.003 | 0.003 |
| Diethyl Succinate | ND | ND | ND |
| C8 Ethyl Ester | 0.120 | 0.069 | 0.08 |
| Octalactone | ND | ND | ND |
| Phenethyl Acetate | ND | ND | ND |
| Nonalactone | ND | ND | ND |
| C10 Ethyl Ester | 0.274 | 0.184 | 0.18 |
| C12 Ethyl Ester | 0.083 | 0.055 | 0.055 |
| C14 Ethyl Ester | 0.028 | 0.020 | 0.019 |
| Ethyl Palmitoleate | 0.002 | 0.002 | 0.001 |
| C16 Ethyl Ester | 0.117 | 0.129 | 0.118 |
| Ethyl Linoleate | 0.024 | 0.016 | 0.016 |
| Ethyl Oleate | 0.055 | 0.039 | 0.037 |
| C18 Ethyl Ester | 0.005 | 0.004 | 0.003 |

ND — NONE DETECTED
UP — UNRESOLVED PEAK

I claim:

1. A continuous, single pass process for the removal of a portion of the alcohol from distilled spirits in a reverse osmosis permeator system comprised of at least one semi-permeable membrane, said process comprised of the steps of feeding a stream of distilled spirits into said system, pressurizing the feed stream against the permeable membrane in a pressure range between 1000–1500 psig, and separating said feed stream into permeate and retentate components.

2. A continuous, once through process for the reduction of the alcohol content of distilled spirits comprising the steps of employing reverse osmosis permeator system comprised of at least one semi-permeable membrane, passing a feed stream of distilled spirits of a proof in the range of 50 to 180 into said system separating said feed stream into permeate and retentate components, maintaining the temperature of the system between 40° F. and 90° F. and then applied pressure between 1000–1500 psig, said semi-permeable membrane having chloride ion rejection capabilities greater than 90% at 800 psig and 25° C.

3. The process as set forth in claim 2 wherein prior to entering the permeator system the feed stream passes through at least one filter.

4. The process as set forth in claim 3 wherein the permeate stream contains between 26% and 67% of the alcohol contained in the feed stream.

5. The process according to claim 4 whereby the percent of the feed recovered as permeate is in the range of 50–95%.

6. The process according to claims 2–5 wherein the permeator system is comprised of at least one membrane composed of 2,4-diaminobenzenesulfonic acid, calcium salt (2:1), polymer with 1,3-benzenediamine, 1,3-benzenedicarbonyl dichloride, and 1,4-benzenedicarbonyl dichloride as the polymer membrane.

7. The process of claim 6 whereby the retentate stream is combined with water in an amount equal to the amount of the feed stream removed as permeate in order to produce a distilled spirit with a reduced alcohol content which retains the flavor and organoleptic properties of the distilled spirit which comprised the feed stream entering the permeator system.

8. The process according to claim 7 whereby the distilled spirit with a reduced alcohol content can be blended into a product having a proof of 54 without diluting the congeners responsible for organoleptic properties.

9. The process of claim 6 whereby the retentate is combined with water and a whiskey blend, the water and whiskey blend being an amount equal to the amount of the feed stream in order to produce a distilled spirit with a reduced alcohol content which retains the flavor and organoleptic properties of the distilled spirit which comprises the feed stream entering the permeator system.

10. A reduced alcohol product obtained in accordance with the process of claim 2 wherein the feed stream is obtained by reducing barrel strength distilled spirits to 100 proof with water and passing the feed stream through at least one filter prior to entering the reverse osmosis permeater system.

* * * * *